United States Patent [19]

Nijmolen et al.

[11] Patent Number: 4,790,006
[45] Date of Patent: Dec. 6, 1988

[54] METHOD FOR ELECTRICALLY SIMULATING A CRADLE SWITCH AND A HANDS FREE TALKING-LOUDSPEAKING KEY IN A HANDS FREE TALKING-LOUDSPEAKING TELEPHONE STATION

[75] Inventors: Gerrit W. Nijmolen; Franz Bloechl, both of Bocholt, Fed. Rep. of Germany

[73] Assignee: Siemens Aktiengesellschaft, Berlin and Munich, Fed. Rep. of Germany

[21] Appl. No.: 25,659

[22] Filed: Mar. 13, 1987

[30] Foreign Application Priority Data

Mar. 21, 1986 [DE] Fed. Rep. of Germany ....... 3609706

[51] Int. Cl.⁴ .............................................. H04M 1/02
[52] U.S. Cl. .................................... 379/388; 379/387; 379/396
[58] Field of Search ............... 379/354, 355, 387, 388, 379/389, 390, 391, 396, 420, 424, 422, 61, 58

[56] References Cited

U.S. PATENT DOCUMENTS

| | | | |
|---|---|---|---|
| 4,413,158 | 11/1983 | Danford | 379/355 X |
| 4,497,980 | 2/1985 | Gorman et al. | 379/387 X |
| 4,503,291 | 3/1985 | von Holten et al. | 379/355 |
| 4,506,112 | 3/1985 | Bitsch | 379/424 X |
| 4,550,226 | 10/1985 | Teater | 379/387 X |
| 4,567,326 | 1/1986 | Sato et al. | 379/355 |
| 4,591,666 | 5/1986 | Boeckmann | 379/355 X |
| 4,636,588 | 1/1987 | Nakayama et al. | 379/362 |
| 4,645,882 | 2/1987 | Nakayama et al. | 379/387 |
| 4,647,787 | 3/1987 | Pommer, II | 379/413 |
| 4,661,977 | 4/1987 | Howett | 379/355 |
| 4,675,902 | 6/1987 | Boeckmann | 379/394 |

FOREIGN PATENT DOCUMENTS

| | | |
|---|---|---|
| 2543029 | 3/1977 | Fed. Rep. of Germany ...... 379/387 |
| 3307779 | 10/1984 | Fed. Rep. of Germany . |
| 3322642 | 1/1985 | Fed. Rep. of Germany ...... 379/388 |
| 3407203 | 8/1985 | Fed. Rep. of Germany ...... 379/387 |
| 3423682 | 1/1986 | Fed. Rep. of Germany ...... 379/424 |
| 0087656 | 6/1982 | Japan ................................. 379/388 |
| 0062957 | 4/1983 | Japan ................................. 379/388 |
| 2132447 | 7/1984 | United Kingdom ............... 379/424 |
| 2174578 | 11/1986 | United Kingdom ............... 379/420 |

Primary Examiner—Jin F. Ng
Assistant Examiner—Randall S. Vaas
Attorney, Agent, or Firm—Hill, Van Santen, Steadman & Simpson

[57] ABSTRACT

A method for electronically simulating a cradle switch and a hands free talking-loudspeaking key in a telephone station. The cradle switch and hands free talking-loudspeaking key must be functionally coupled to one another in such a telephone station. This is generally effected mechanically. Structural difficulties and an operator-unfriendly arrangement of the key have thus resulted. To solve these problems, a control pulse generator is provided which, by an appropriate emission of control pulses following the actuation of the key and/or the cradle switch, triggers the individual functions in the participating assemblies of the telephone station. In the rest state, the control pulse generator and a dialing store of the keyboard are maintained on standby by a weak, line-fed standby current supply. The method is suitable for all hands free talking-loudspeaking telephone stations.

4 Claims, 1 Drawing Sheet

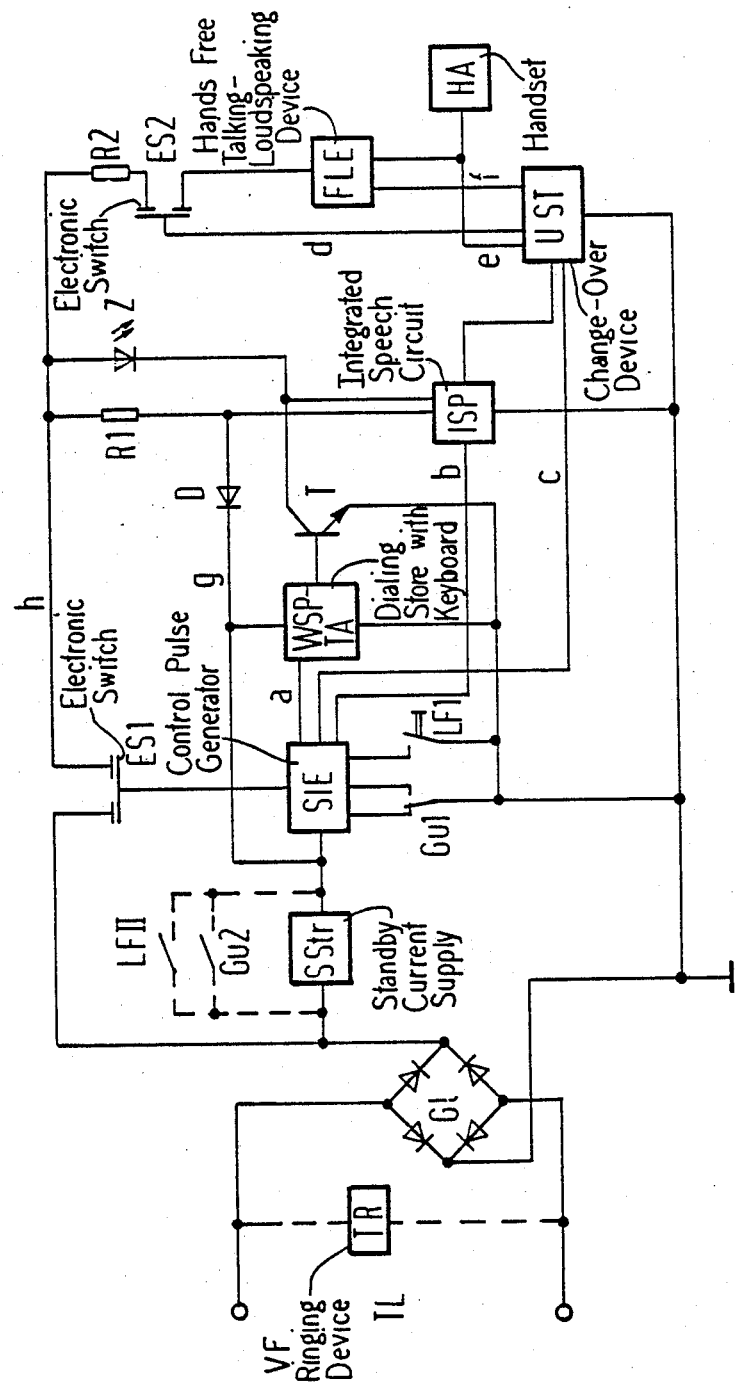

4,790,006

METHOD FOR ELECTRICALLY SIMULATING A CRADLE SWITCH AND A HANDS FREE TALKING-LOUDSPEAKING KEY IN A HANDS FREE TALKING-LOUDSPEAKING TELEPHONE STATION

BACKGROUND OF THE INVENTION

The invention relates to a method for electronically simulating a cradle switch and a handle free talking-loudspeaking key in a hands free talking-loudspeaking telephone station. Such a station has facilities for dialing when the handset is in place. Its power is supplied from the subscriber line, and it has an integrated speech circuit, a keyboard for abbreviated dialing and automatic redialing, and reverse polarity protection.

For hands free talking and loudspeaking operation, and for dialing when the handset is in place, the appropriate operation is generally introduced by means of a locking key, the switching state of which can be recognized by an appropriate arrangement. The lock must be released when the handset is lifted at the end of the dialing procedure. In loudspeaking operation, the lock must be released at the end of the conversation. Therefore, a structural assignment to the cradle switch is necessary (See No. P 33 07 779.7, incorporated herein), which generally prevents an opeator-friendly arrangement of the hands free talking-loudspeaking key.

SUMMARY OF THE INVENTION

An object of the invention is to find a method whereby both the cradle switch contact and the hands free talking-loudspeaking key can be electronically simulated in dependence upon one another, and therefore can be provided independently of location, and wherein the electronic devices necessary for this purpose are simultaneously used to perform further functions, such as the switch-over of supply voltage and the generation of dialing pulses.

According to the invention, an electronic control pulse generator is provided, combined with the keyboard and dialing store, and with an electronic change-over device. One wire of the telephone channel within the station contains a first electronic contact which, when operated appropriately by the control pulse generator, connects the supply circuit for the station when the handset is lifted (simulation of cradle switch contact Gu), or when a hands free talking-loudspeaking key is briefly actuated. During subscriber dialing, when operated appropriately by the control pulse generator, the change-over device interrupts the line for pulse dialing. When the hands free talking-loudspeaking key is actuated by a control signal of the control pulse generator, the change-over device through control of a second electronic switch, connects the hands free talking-loudspeaking device with power. When the station is in the rest state, the control pulse generator and the keyboard and dialing store are supplied with supply voltage via a standby current supply.

This results in the advantage that the hands free talking-loudspeaking key can be simple-non-locking key. Such a key can be arranged at any desired location of the telephone station. The telephone station can be supplied with power in a simple fashion even in the rest state. Depending upon requirements, a switch-over to a weak or a strong power supply is carried out in a simple fashion. The electronic contact which serves to switch the power supply is additionally used to convey the dialed information to the telephone system.

BRIEF DESCRIPTION OF THE DRAWINGS

The method in accordance with the invention is illustrated by the schematic diagram of the Drawing Figure.

DESCRIPTION OF THE PREFERRED EMBODIMENTS

The figure is a basic diagram of a subscriber line TL, a VF ringing device TR, a reverse polarity protection device GL, a standby current supply SStr, a control pulse generator SIE, a push-button dialing set with dialing store WSP-TA, an integrated speech circuit ISP, a change-over device UST, a hands free talking-loudspeaking device FLE, two electronic switches ES1 and ES2, a light-emitting diode Z, a switching element T, a diode D, a talking-loudspeaking key LF1 and a cradle switch contact Gu.

When the telephone station is in the rest state, a very low level of power is tapped by a standby current supply SStr from the subscriber line TL via the reverse polarity protection device GL, which consists of a full-wave rectifier.

This power is sufficient to continuously supply a control pulse generator SIE which fundamentally is formed of a microprocessor, and which in practice forms one unit with the integrated speech circuit ISP and the change-over device UST. The standby current supply also supplies the keyboard and dialing store, thus ensuring the availability of the dialing information stored therein.

When the telephone station is set in operation, in the event of an incoming connection request for a VF ringing-in operation using the handset, first the cradle switch Gu is actuated. This causes the control pulse generator SIE to switch through the electronic switch ES1 so that now a strong supply current flows along the telephone channel line h for the operation of the entire telephone station. The diode D decouples the weak supply voltage of the standby current supply SStr on the line g from the main supply voltage via the switch ES1. If the telephone station is operated for outgoing dialing, the dialing pulses are emitted from the keyboard and dialing store WSP-TA via the line a to the control signal device SIE, which itself controls the electronic switch SE1 as a loop interrupt contact in the timing of the dialing pulses.

If dialing is carried out in the telephone station with the handset HA in place, the hands free talking-loudspeaking key LFI must be briefly actuated. As already described, this likewise causes the main supply voltage to be switched through via the electronic switch ES1.

Furthermore, via the line b, the integrated speech circuit ISP, and the line c, the change-over device UST is operated in such a manner that it connects the hands free talking-loudspeaking device FLE (loudspeaking component) via the line f. At the same time a second electronic switch ES2 is switched through via the line d so that the main supply voltage is connected to the hands free talking-loudspeaking device FLE via the dimensioning resistor R2.

In this operating situation the signal pulse generator SIE controls the keyboard (WSP-TA) via the line a in such a manner that the keyboard supplies the switch T (transistor) with switching pulses corresponding to the dialing pulses so that the light-emitting diode Z illuminates in the dialing rhythm. The light-emitting diode Z is continuously illuminated during speech operation since it is connected to the operating voltage via the integrated speech circuit ISP.

If a change-over is made in the telephone station to operation with the handset HA (the handset is lifted), then simply as a result of the automatic actuation of the cradle switch Gu, pulses of the control pulse generator SIE control the change-over device UST (via line c) in such a manner that the hands free talking-loudspeaking device FLE is disconnected and the handset is connected (line c).

When the hands free talking-loudspeaking key LFI is actuated in this operating state, the loudspeaking component of the hands free talking-loudspeaking device FLE is connected via the change-over device UST in the described manner. When the handset HA is replaced, the rest state of the telephone station is re-established without any further actuation of keys.

If the continuous tapping of a low level of power from the subscriber line is impermissible, the standby current supply SStr can be replaced by a second contact (LFII) of the key LFI and a second contact (Gu2) of the cradle switch. In this way the control signal generator SIE is immediately supplied with supply voltage when the handset HA is lifted or when the hand free talking-loudspeaking key LFI is actuated. The information contained in the dialing store of the keyboard must then be maintained by a battery voltage.

If the control signal generator SIE is likewise supplied with battery voltage when the telephone station is in the rest state, the standby current supply SStr and the contacts Gu2/LFII can be dispensed with.

Although various minor changes and modifications might be proposed by those skilled in the art, it will be understood that we wish to include within the claims of the patent warranted hereon all such changes and modifications as reasonably come within our contribution to the art.

We claim as our invention:

1. A hands free talking telephone station, comprising:
    a subscriber line connecting to an input of a reverse polarity protection device, an output of the protection device connecting to a telephone channel line;
    the telephone channel line connecting to a hands free talking-loudspeaking device and wherein first and second switches are provided in series between the hands free talking-loudspeaking device and said reverse polarity protection device in said channel line;
    a handset, and a change-over means connected for activating either said hands free talking-loudspeaking device or said handset, and also for controlling said second switch;
    an integrated speech circuit connecting to said changeover device;
    a keyboard and an associated dialing store means for abbreviated dialing and automatic redialing;
    a control pulse generator means having a first output connecting to the first switch, a control line connecting to the dialing store means, a second output connecting to the change-over means, another control line connecting to the integrated speech circuit, a first input connecting to a cradle switch contact, and a second input connecting to a hands free talking-loudspeaking key;
    a standby current supply connecting between said telephone channel line and said control pulse generator means;
    an electronic switch controlling a light and controlled by the keyboard and associated dialing store means;
    said control pulse generator means actuating said first switch to connect power from the subscriber line to the station when said handset is lifted or when said hands free talking-loudspeaking key is briefly actuated, during subscriber dialing said control pulse generator means controlling said first switch to interrupt the channel line in accordance with pulse dialing at said keyboard and also controlling the electronic switch and connected light via the keyboard and dialing store means in accordance with the pulse dialing, and said control pulse generator means controlling the change-over device such that the change-over device connects the hands free talking-loudspeaking device with the power on the telephone channel line by controlling the second switch given actuation of said hands free talking-loudspeaking key; and
    said standby current supply being connected such that in a rest state the control pulse generator means, the keyboard, and the associated dialing store means are supplied with supply voltage from said standby current supply.

2. A station according to claim 1 wherein the standby current supply comprises a battery.

3. A station according to claim 1 wherein means are provided such that when the first switch is closed, a relatively weak supply voltage supplied via the standby current supply is decoupled from a stronger supply voltage resulting on the telephone channel line through power received from the subscriber line.

4. A hands free talking telephone station, comprising:
    a telephone channel line and means for connecting a subscriber line to the telephone channel line;
    the telephone channel line connecting to a hands free talking-loudspeaking device and wherein first and second switches are provided in series between the hands free talking-loudspeaking device and said means for connecting to the subscriber line;
    a handset, and a change-over means connected for activating either said hands free talking-loudspeaking device or said handset and also for controlling said second switch;
    an integrated speech circuit connecting to said change-over device;
    a dialing store means with an associated keyboard for abbreviated dialing and automatic redialing;
    a control pulse generator means having a first output connecting to the first switch, a control line connecting to the dialing store means, a second output connecting to the changeover means, another control line connecting to the integrated speech circuit, a first input connecting to a cradle switch, and a second input connecting to a hands free talking-loudspeaking key;
    a standby current supply connecting between said telephone channel line and said control pulse generator means;
    an electronic switch with a connected light controlled by said dialing store means with associated keyboard;
    said standby current supply being connected such that in a rest state the control pulse generator means and dialing store means with associated keyboard are supplied with supply voltage from said standby current supply, and means being provided to decouple the standby current supply from the telephone channel line when the first switch is closed; and said control pulse generator means controlling the change-over means upon actuation of the hands free talking-loudspeaking key such that the hands free talking-loudspeaking device is turned on and is provided with power from the telephone channel line via the second switch controlled by the change-over means, and also upon actuation of the hands free talking-loudspeaking key, said control pulse generator means controlling said electronic switch via said dialing store means with associated keyboard such that the light is controlled in accordance with dialing at said keyboard and during talking on the station.

* * * * *